(12) United States Patent
Fannasch et al.

(10) Patent No.: US 7,198,302 B1
(45) Date of Patent: *Apr. 3, 2007

(54) CARD-SHAPED DATA CARRIER AND METHOD FOR PRODUCING SAME

(75) Inventors: Lothar Fannasch, Bielefeld (DE); Dirk Fischer, Paderborn (DE); Michael Hennemeyer-Schwenker, Herbram (DE)

(73) Assignee: Orga Systems GmbH, Paderborn (DE)

( * ) Notice: Subject to any disclaimer, the term of this patent is extended or adjusted under 35 U.S.C. 154(b) by 364 days.

This patent is subject to a terminal disclaimer.

(21) Appl. No.: 10/069,786

(22) PCT Filed: Aug. 25, 2000

(86) PCT No.: PCT/DE00/02902
§ 371 (c)(1),
(2), (4) Date: Jun. 21, 2002

(87) PCT Pub. No.: WO01/15910

PCT Pub. Date: Mar. 8, 2001

(30) Foreign Application Priority Data

Aug. 30, 1999 (DE) ............................ 199 41 225
Mar. 9, 2000 (DE) ............................ 100 11 486

(51) Int. Cl.
*B42D 15/00* (2006.01)
(52) U.S. Cl. ...................... 283/100; 428/64.1
(58) Field of Classification Search ............ 283/67, 283/114, 75, 100; 219/121.69; 430/270.1, 430/944, 945, 200, 270.16; 428/64.1, 64.4, 428/64.8, 913, 64.2, 212
See application file for complete search history.

(56) References Cited

U.S. PATENT DOCUMENTS

| | | | | |
|---|---|---|---|---|
| 4,732,410 A | * | 3/1988 | Holbein et al. | ............... 283/67 |
| 5,234,890 A | * | 8/1993 | Burberry et al. | ............ 503/227 |
| 5,240,900 A | * | 8/1993 | Burberry | .................... 503/227 |
| 5,289,547 A | * | 2/1994 | Ligas et al. | .................... 283/72 |
| 6,107,010 A | | 8/2000 | Corniglion et al. | |
| 6,827,283 B2 | * | 12/2004 | Kappe et al. | ............... 235/494 |
| 6,986,926 B2 | * | 1/2006 | Fannasch et al. | .......... 428/64.1 |

FOREIGN PATENT DOCUMENTS

| | | | |
|---|---|---|---|
| GB | 2240948 A | * | 8/1991 |
| WO | WO 89/05730 A1 | | 6/1989 |
| WO | WO 94/12352 | * | 6/1994 |
| WO | WO 96/35585 | * | 11/1996 |
| WO | WO 97/16318 A1 | | 5/1997 |
| WO | WO 97/48016 A1 | | 12/1997 |
| WO | WO 98/19868 | * | 5/1998 |

* cited by examiner

*Primary Examiner*—Monica Carter
*Assistant Examiner*—J Williams
(74) *Attorney, Agent, or Firm*—Foley & Lardner LLP

(57) ABSTRACT

The invention relates to a card-shaped data carrier consisting of at least one layer (1, 2, 3). Visually readable information in the form of a changed optical characteristic is introduced into the layer. Said characteristic is changed by irreversibly changing the material by means of a laser beam. The absorption capacity of said layer (1, 2, 3) for at least one wavelength ($\lambda \pm \lambda$) is at least partially reduced due to the laser radiation.

12 Claims, 1 Drawing Sheet

CARD-SHAPED DATA CARRIER AND METHOD FOR PRODUCING SAME

The invention relates to a card-shaped data carrier and to a method for producing same.

Card-shaped data carriers of this type are identity cards, bank cards, credit cards or the like made of plastic.

DE 29 07 004 C2 discloses the practice of applying visually readable information to identity cards by means of laser radiation. In this case, the information becomes visible as a result of carbonization of the plastic material, the information standing out in black or gray from a background of a different color (for example opaque or transparent). Other colors cannot be produced by this method. In this case, the laser inscription is more secure than other inscription methods with respect to forgeries or manipulations.

Furthermore, it is also known that it is possible to engrave by means of laser radiation, in particular it is possible to remove individual layers locally from a multilayer card body. Use is made of this fact in accordance with DE 30 48 733 C2, in order to apply information of different colors to identity cards. Here, a multilayer card body is used whose layers have different colors. As a result of the local removal of individual layers by means of laser radiation, the differently colored layer lying underneath becomes visible. This method of inscribing card-shaped data carriers has the disadvantage, however, that the surface of the data carrier is damaged by the removal.

It is an object of the invention to provide a card-shaped data carrier and a method for producing same which permits the application of colored information by means of reliable laser processing without damaging the surface of the data carrier.

This object is achieved by the characterizing features of the independent claims. In this case, the invention is based on the idea of reducing the absorption capacity of at least one layer of the data carrier for at least one wavelength (wavelength range) locally and selectively by means of laser radiation. The absorption and reflection characteristics of the layer are therefore changed locally, and therefore so is the color impression at this point.

DETAILED DESCRIPTION OF THE PREFERRED EMBODIMENT

Figure 1:
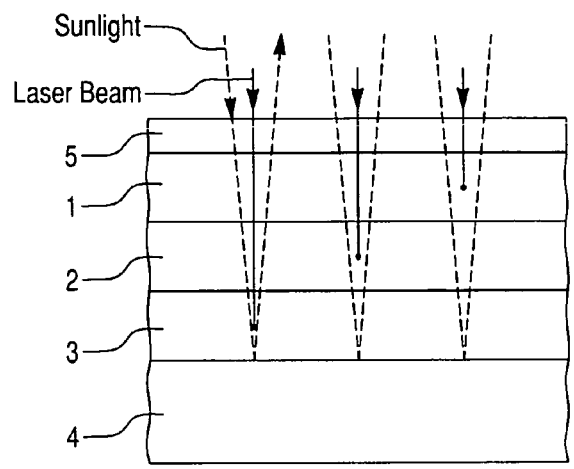
FIG. 1 is a schematic diagram of a card-shaped data carrier in accordance with one embodiment of the present invention.

FIG. 1 shows a detail from a card-shaped data carrier which has three layers (1 2, 3), each having different absorption spectra before the laser irradiation. These three layers (1 2, 3) are preferably located on a white substrate layer (4). In addition, above the three layers (1, 2, 3) whose absorption is to be changed under the influence of the laser radiation, there is a covering layer (5) which is transparent in the visible wavelength range and in the range of the laser radiation used.

Figure 2:
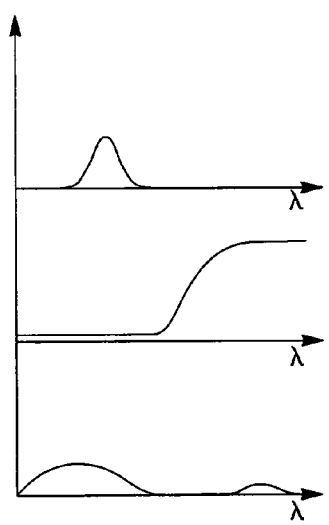
FIG. 2 is a graph of the absorption wavelength spectrum of the layers before laser irradiation.

FIG. 2 shows the absorption spectra of the layers (1, 2, 3) before the laser irradiation.

The absorption behavior before the laser irradiation and, respectively, the reflection behavior after the laser inscription of the individual layers is effected by appropriately color-imparting pigments, which are added to the layers as additives. Ideally, a layer is bleached out completely locally by the laser radiation, so that the layer on its own is at least virtually transparent locally (in the laser writing spot).

In the exemplary embodiment illustrated, the first laser-sensitive layer (1) has an absorption maximum in the green spectral range. Before the laser irradiation, this layer (1) has a magenta color. The second laser-sensitive layer (2) has an absorption maximum in the red spectral range. Before the laser irradiation, this layer (2) has a cyan color. The third laser-sensitive layer (1) has an absorption maximum in the blue spectral range. Before the laser irradiation, this layer (1) is yellow.

Under irradiation with a green laser beam of sufficient intensity, the first laser-sensitive layer (1) loses its absorption capacity locally where it was acted on by the green laser radiation, and therefore this layer (1) is transparent at this point. When this point is viewed under white sunlight, this point (spot) appears green, the coloration being effected on the basis of subtractive color mixing. The incident light beam (white light, for example sunlight) passes through the first layer (1) which is transparent after the application of the laser beam. As it passes through the second layer (2), the red component is filtered out of the white light beam by absorption. As it passes through the third layer (3), the blue component is filtered out of the light beam, so that from the original white light beam, only the green component remains. Finally, the green light beam is reflected at the white substrate layer (4). To the observer, this point appears green.

Under irradiation with a red laser beam of sufficient intensity, the second laser-sensitive layer (1) loses its absorption capacity locally where it was acted on by the red laser radiation, and therefore this layer (2) is transparent at this point. When this point is viewed under white sunlight, this point (spot) appears red, the coloration being effected on the basis of subtractive color mixing. As it passes through the first layer (1), the green component is filtered out of the white light beam. The light beam passes without absorption through the second layer (2), which is transparent at this point after the application of the laser beam. As it passes through the third layer (3), the blue component is filtered out of the light beam, so that from the original white light beam, only the red component remains. Finally, the red light beam is reflected at the white substrate layer (4). To the observer, this point appears red.

Under irradiation with a blue laser beam of sufficient intensity, the third laser-sensitive layer (3) loses its absorption capacity locally where it was acted on by the blue laser radiation, and therefore this layer (3) is transparent at this point. When this point is viewed under white sunlight, this point (spot) appears blue, the coloration being effected on the basis of subtractive color mixing. As it passes through the first layer (1), the green component is filtered out of the white light beam. As it passes through the second layer (2), the red component is filtered out by means of absorption. The light beam then passes without absorption through the third layer (3), which is transparent at this point after the application of the laser beam, so that from the original white light beam only the blue component remains. Finally, the blue light beam is reflected at the white substrate layer (4). To the observer, this point appears blue.

In this manner, an originally black, gray or dark brown spot can be set to be red, blue or green—depending on which of the laser-sensitive layers (1, 2, 3) in the sandwich construction is bleached.

Figure 3:
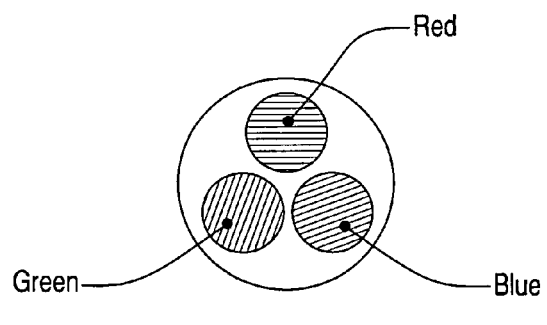
FIG. 3 is a schematic diagram of a triplet of colors in accordance with the present invention.

FIG. 3 illustrates the triplet of colors which may be set in this way. Of course, the application of the laser beam can also be carried out in such a way that the colored points lie one above another.

In one embodiment, the laser-sensitive layers (1, 2, 3) are plastic films, which are connected to one another by lamination. In this case, at least one laser-sensitive layer (1, 2, 3) can also be an adhesive layer between plastic films within the sandwich construction.

In an alternative embodiment, the laser-sensitive layers (1, 2, 3) are applied one after another, layer by layer, for example as varnish, to the white substrate (4) in a coating process.

As compared with a layer in which all the bleachable color pigments (magenta, cyan and yellow) are contained, the layer construction has a great advantage. This is because the colored pigments differ not only with regard to their absorption maximum, where they are bleached, but otherwise also, with regard to their chemical and physical properties, in particular not every pigment can be introduced to any plastic film or varnish. Furthermore, the pigments can also influence one another. If, by contrast, a dedicated layer is selected for each pigment, then the plastic film or the varnish can be coordinated specifically with this pigment.

Of course, the invention is not restricted to three laser-sensitive layers. Instead, there may also be two or four laser-sensitive layers.

The invention claimed is:

1. A card-shaped data carrier, comprising at least two or more layers into which visually readable information is introduced in the form of a change in the optical property on the basis of a material change effected irreversibly by a laser beam while preserving the surface of the card-shaped data carrier,
    wherein each layer has a different absorption capacity for at least one wavelength ($\lambda \pm \Delta\lambda$), and
    wherein the absorption capacity of at least one layer for at least one wavelength ($\lambda \pm \Delta\lambda$) is at least partly reduced as a result of the laser radiation.

2. A card-shaped data carrier as claimed in claim 1, wherein each layer has colored pigments which, under the influence of laser radiation with the wavelength ($\lambda \pm \Delta\lambda$), at least partly lose their absorption capacity for the wavelength ($\lambda \pm \Delta\lambda$).

3. The card-shaped data carrier as claimed in claim 1, comprising
    at least two layers each of which has a respectively different absorption capacity for a different wavelength ($\lambda_1 \pm \Delta\lambda_1$, $\lambda_2 \pm \Delta\lambda_2$, $\lambda_3 \pm \Delta\lambda_3$),
    the absorption capacity of a first layer for a first wavelength ($\lambda_1 \pm \Delta\lambda_1$) being at least partly reduced under the influence of the laser radiation of the first wavelength ($\lambda_1 \pm \Delta\lambda_1$), and
    the absorption capacity of a second layer for a second wavelength ($\lambda_2 \pm \Delta\lambda_2$) being at least partly reduced under the influence of the laser radiation of the second wavelength ($\lambda_2 \pm \Delta\lambda_2$).

4. The card-shaped data carrier as claimed in claim 1, wherein at least one of the layers is at least partly transparent to visible light (400 nm to 800 nm).

5. The card-shaped data carrier as claimed in claim 1, wherein the layers whose absorption capacity is reduced under the influence of the laser radiation are arranged on a white substrate layer.

6. The card-shaped data carrier as claimed in claim 1, wherein a covering layer that is transparent to visible light is arranged over the layers whose absorption capacity is reduced under the influence of the laser radiation.

7. The card-shaped data carrier as claimed in claim 2, wherein the layers are plastic films laminated one over another, in which the colored pigments are contained.

8. The card-shaped data carrier as claimed in claim 2, wherein the layers are varnish layers arranged one above another, in which the colored pigments are contained.

9. A method for applying information to card-shaped data carriers, the card-shaped data carrier having at least one layer into which visually readable information is introduced in the form of a change in an optical property on the basis of a material change effected irreversibly by a laser beam while preserving the surface of the card-shaped data carrier, comprising
    the provision of a card-shaped data carrier which has two or more layers which have a respectively different absorption capacity for at least one wavelength ($\lambda \pm \Delta\lambda$), and the absorption capacity of at least one layer for at least one wavelength ($\lambda \pm \Delta\lambda$) is at least partly reduced as a result of the laser radiation, and
    acting on this layer of the card-shaped data carrier with the laser radiation, in order to reduce the absorption capacity of this layer for the wavelength ($\lambda \pm \Delta\lambda$).

10. The method as claimed in claim 9 comprising
    the provision of a card-shaped data carrier which has at least a first layer and a second layer each of which has a respectively different absorption capacity for a different wavelength ($\lambda_1 \pm \Delta\lambda_1$, $X_2 \pm \Delta\lambda_2$, $\lambda_3 \pm \Delta\lambda_3$),
    the absorption capacity of the first layer for a first wavelength ($\lambda_1 \pm \Delta\lambda_1$) being at least partly reduced under the influence of laser radiation of the first wavelength ($\lambda_1 \pm \Delta\lambda_1$),
    the absorption capacity of the second layer for a second wavelength ($\lambda_2 \pm \Delta\lambda_2$) being at least partly reduced under the influence of the laser radiation of the second wavelength ($\lambda_2 \pm \Delta\lambda_2$),
    acting on the first layer of the card body with laser radiation of the wavelength ($\lambda_1 \pm \Delta\lambda_1$), in order to reduce the absorption capacity of this layer for the wavelength ($\lambda_1 \pm \Delta\lambda_1$), and
    acting on the second layer of the card body with laser radiation of the second wavelength ($\lambda_2 \pm \Delta\lambda_2$), in order to reduce the absorption capacity of this layer for the second wavelength ($\lambda_2 \pm \Delta\lambda_2$).

11. The method as claimed in claim 10, wherein each layer has colored pigments, and the layers are plastic films laminated one over another, in which the colored pigments are contained.

12. The method as claimed in claim 10, wherein each layer has colored pigments, and the layers are varnish layers arranged one above another, in which the colored pigments are contained.

* * * * *